(No Model.)
W. & T. MENZIE.
POTATO DIGGER.
No. 511,348. Patented Dec. 26, 1893.
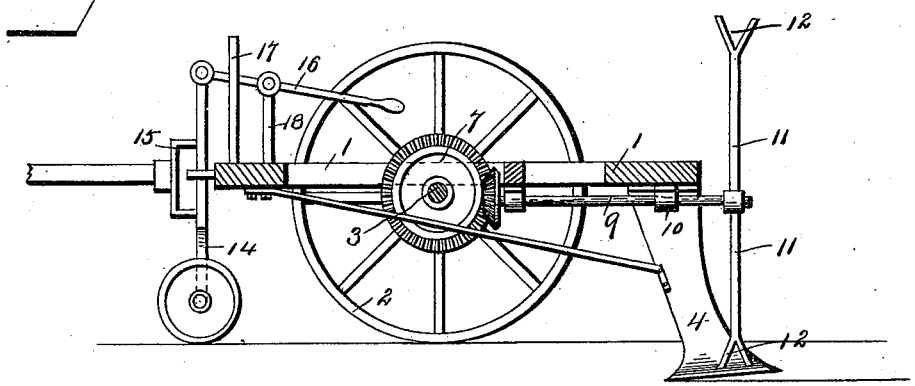
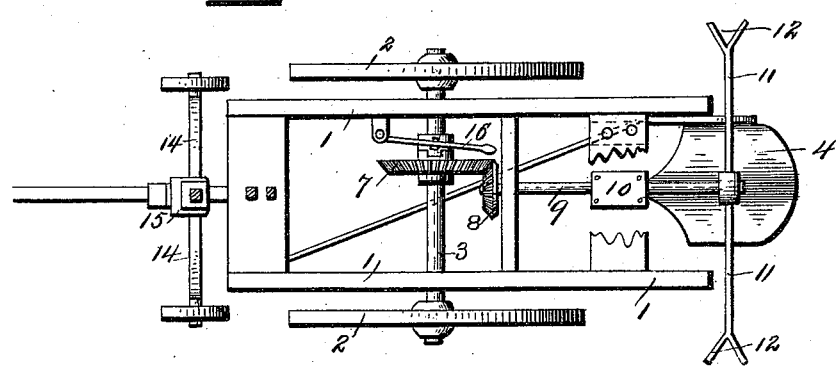
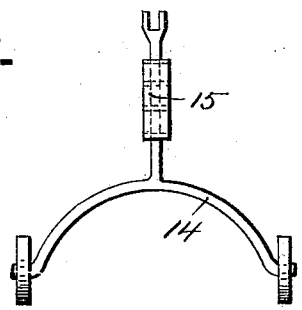 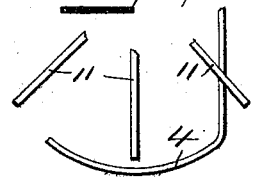
WITNESSES:
C. E. Hunt.
F. R. Harding,
INVENTORS.
William Menzie
Thomas Menzie.
BY
O. D. Levis,
ATTORNEY.

UNITED STATES PATENT OFFICE.

WILLIAM MENZIE AND THOMAS MENZIE, OF WESTMORELAND, PENNSYLVANIA.

POTATO-DIGGER.

SPECIFICATION forming part of Letters Patent No. 511,348, dated December 26, 1893.

Application filed September 28, 1891. Serial No. 407,087. (No model.)

*To all whom it may concern:*

Be it known that we, WILLIAM MENZIE and THOMAS MENZIE, citizens of the United States, residing at Westmoreland, (McKeesport P. O.,) in the county of Westmoreland and State of Pennsylvania, have invented certain new and useful Improvements in Potato-Diggers; and we do hereby declare the following to be a full, clear, and exact description of the invention, such as will enable others skilled in the art to which it pertains to make and use the same, reference being had to the accompanying drawings, which form a part of this specification.

Our invention relates to an improved potato digger, and consists in certain details of construction, and combination of parts as will be fully described hereinafter.

In the accompanying drawings, Figure 1 is a sectional side elevation of our improved potato digger, which is constructed in accordance with our invention. Fig. 2 is a plan view of the same. Fig. 3 is a front elevation of the forward axle, and its connection with the frame of the machine. Fig. 4, is a rear view of the plow, and its rotating fork wheel.

To construct a potato digger in accordance with our invention we provide a frame 1, and mount the same on wheels, 2, and attach the said frame to the axle 3, in a manner that will permit a slight oscillation of the same. Attached to the rear of this frame 1, is a downwardly extending plow or shovel, 4, bent in the form of a scoop, which is adapted to enter the row of potatoes, and plow the earth over the said shovel 4. Attached to the axle, 3 and operated by a clutch, 6 is a large gear wheel, 7, which meshes with a bevel pinion, 8 secured to a shaft, 9 extending rearwardly over the center of the shovel, and held in that position by means of suitable bearings 10, firmly attached to the under side of the frame. Attached to the rear of this shaft 9, is a wheel consisting of a number of radial arms, 11 each of which is formed with a forked end, 12 and adapted to operate over the rear portion of the shovel or plow. Connected to the forward end of the frame 1, is a truck, having an upright portion 14, and an open link 15, to which latter the pole for the horses is attached. Loosely connected to this link 15, is the forward part of the frame 1 in a manner that the said frame may be moved vertically a short distance. As shown, the splayed yoke of the truck, the upright standard rising centrally therefrom, and the open link, are all formed in one piece of metal to cheapen the construction, and to insure strength and durability. This movement of the forward part of the frame 1, is for the purpose of regulating the depth of the plow or shovel in the ground, and the said movement is controlled and the frame held in any desired position by means of a lever, 16 and a notched bar, 17, said lever being fulcrumed to a support 18 projecting upward from the frame 1, and having its forward end pivoted to the upper extremity of said upright 14.

In operation, horses are hitched to the pole at the forward end of the apparatus, and the shovel or plow regulated as above described to enter the ground. The two forward and two rear wheels are made to straddle the row of potatoes and the apparatus given a forward movement. This movement will cause the plow to lift the earth and potatoes contained therein over the plow, and the gearing rotating the forked wheel will pulverize the said earth, and throw the potatoes to one side of the apparatus.

We are aware that the general features and details of this invention are not new, but by means of our improved and special construction of the forward wheeled truck comprising a splayed curved yoke made in one piece with an integral standard or upright rising centrally therefrom and provided with an integrally formed link serving the dual purpose of a coupling link for the rear portion of the machine and a draft link for the front draft appliances, taken in conjunction with the other essential elements co-operating to produce an operative and concrete whole, we are enabled to produce a machine of this class which will be inexpensive in manufacture, and which will be exceedingly strong and durable in use.

Having thus described our invention, what we claim, and desire to secure by Letters Patent, is—

In a potato-digging machine, the combination with the rear-frame swiveled upon the main-axle and limited in its swing thereupon, and the mechanism for digging, uprooting, and stirring the potatoes carried by said frame, of a wheeled truck constituting the forward portion of the machine and comprising a splayed yoke carrying movable ground-wheels, a vertical standard or upright rising centrally from and formed integral with the said yoke, and an open rectangular link formed integral with the standard and projecting horizontally and forwardly from the same, draft appliances connected to said link, a coupling between said link and the rear-frame; said coupling being capable of a vertical play on said link, a hand lever pivotally connected to the upper end of the standard or upright and fulcrumed on an upright of the rear frame, and a rack-bar to hold the hand-lever in a set position, as specified.

In testimony that we claim the foregoing we hereunto affix our signatures this 20th day of August, A. D. 1891.

WILLIAM MENZIE. [L. S.]
THOMAS MENZIE. [L. S.]

In presence of—
CHARLES LARGE,
M. E. HARRISON.